(12) United States Patent
Yang et al.

(10) Patent No.: US 12,376,557 B2
(45) Date of Patent: Aug. 5, 2025

(54) RAPID CLEANING SYSTEM OF MILKING CUPS IN MILKING HALL

(71) Applicant: Qingdao Agricultural University, Qingdao (CN)

(72) Inventors: Yongxin Yang, Qingdao (CN); Tao Wu, Qingdao (CN); Honglong Zhu, Qingdao (CN); Xiaxia Wang, Qingdao (CN); Rongwei Han, Qingdao (CN); Rongbo Fan, Qingdao (CN); Jun Wang, Qingdao (CN); Qijing Du, Qingdao (CN); Hongning Jiang, Qingdao (CN)

(73) Assignee: Qingdao Agricultural University, Qingdao (CN)

( * ) Notice: Subject to any disclaimer, the term of this patent is extended or adjusted under 35 U.S.C. 154(b) by 0 days.

(21) Appl. No.: 18/380,246

(22) Filed: Oct. 16, 2023

(65) Prior Publication Data
US 2024/0122153 A1    Apr. 18, 2024

(51) Int. Cl.
*A01J 7/02*        (2006.01)

(52) U.S. Cl.
CPC .................. *A01J 7/025* (2013.01)

(58) Field of Classification Search
CPC .................. A01J 7/025; A01J 7/02
See application file for complete search history.

(56) References Cited

FOREIGN PATENT DOCUMENTS

CN          211458395 U      9/2020
WO          WO-9966786 A1 *  12/1999   .............. A01J 7/025

* cited by examiner

*Primary Examiner* — Kristen C Hayes
(74) *Attorney, Agent, or Firm* — Bayramoglu Law Offices LLC (57) ABSTRACT

A rapid cleaning system of milking cups in milking hall is provided. The rapid cleaning system includes a bottom plate, a supporting pipe fixed on the top of the bottom plate, a supporting positioning component fixed on the top of the supporting pipe, a lifting mechanism sliding sleeved with the supporting pipe, and a clamping and fixing mechanism connected to the outer ring of the supporting pipe and the supporting positioning component. A placing platform for the milking cup group is provided, in the process of placing the milking cup group, the milking cup group is cleaned and disinfected.

5 Claims, 6 Drawing Sheets

RAPID CLEANING SYSTEM OF MILKING CUPS IN MILKING HALL

CROSS REFERENCE TO THE RELATED APPLICATIONS

This application is based upon and claims priority to Chinese Patent Application No. 202211260362.5, filed on Oct. 14, 2022, the entire contents of which are incorporated herein by reference.

TECHNICAL FIELD

The present invention relates to the field of animal husbandry and specifically relates to a rapid cleaning system of milking cups in milking halls.

BACKGROUND

Bovine mastitis is an inflammatory response elicited by the intrusion of pathogenic microorganisms into the mammary gland tissue, rendering it the prevailing malady in dairy farming establishments. Numerous studies have underscored the pivotal role of milking management in mastitis control. Consequently, a well-defined milking protocol has been developed that adeptly curbs the propagation of pathogenic microorganisms. In accordance with the established milking protocol, the process entails immersing the cow's teats in a liquid medication, followed by thorough drying, and the subsequent discarding of the initial three milkings. Furthermore, post-milking, a reapplication of the liquid medication to the teats is performed, thus substantially diminishing pathogenic microorganisms within the teat's terminus, its adjacent vicinity, and the teat canal. However, subsequent to the initiation of machine milking, the consistent utilization of the same milking cup across all cows elevates the potential for residual pathogenic microorganisms within the milking cup to traverse to subsequent cows, thereby amplifying the risk of mammary gland infection and microbial contamination of milk. This practice may even precipitate the onset of bovine mastitis. Additional investigations have highlighted that milk cups frequently serve as a habitat for pathogenic microorganisms, establishing a notable correlation between milk cups and the presence of pathogenic microorganisms in the milk. Consequently, it is imperative to cleanse the milking cup to preclude mammary gland infection and milk contamination.

The patent, No. CN2019222678091, discloses a cleaning device for milking machine equipment. It comprises a milk cup group, a cleaning device, a driving motor and a cylinder. Its characteristic is that, setting a cleaning device under the milk cup group, connecting the bottom of the cleaning device to the top of the hydraulic lifting rod by a connecting rod, the bottom of the hydraulic lifting rod is fixedly connected to the extension shaft of the drive motor, located at the top of the milk cup group, connecting one end of the cylinder piston by the cylinder expansion rope, connecting the other end of the cylinder piston to the cylinder controller; the cleaning device comprises a cleaning box, a cleaning head base, and a cleaning head, where there are cleaning head bases at the four corners of the cleaning box, setting a rectangular cleaning head above the base of the cleaning head that wraps the sponge layer. Compared with the published technology, this cleaning system of milking cups is simple and easy to process; it improves the production efficiency, and ensures the clean hygiene of the milk cup group and the health of the mammary gland of lactating dairy cows.

Although the application scheme can realize the cleaning operation of the milking cup in the cleaning process, the milking cups could be attached with bacteria as cows infected with subclinical mastitis. Thus, the mammary gland is susceptible to infection with mastitis using this milking cup. Therefore, a rapid cleaning system of milking cups in milking hall is needed.

SUMMARY

To solve the technical problems of milking cup cleaning and avoiding cross infection between different batches of milking cows through milking cup group, the invention provides a milking cup rapid cleaning system for milking hall.

This invention is implemented through the following technical arrangement: a rapid cleaning system of milking cups in a milking hall, comprising a bottom plate, a supporting pipe fixed on a top of the bottom plate, a supporting positioning component fixed on a top of the supporting pipe, a lifting mechanism connected with a sliding sleeve of the supporting pipe, a clamping and fixing mechanism set up on an outer ring of the supporting pipe and connected to the supporting positioning component, and a cleaning mechanism set at a bottom of the clamping and fixing mechanism and connected with the sliding sleeve of the supporting pipe;

the supporting positioning component comprises a long strip-shaped supporting plate fixed to the top of the supporting pipe, four sets of guide grooves distributed along an axis array of the supporting pipe on an outside of the supporting plate, a storage groove opened at an opening of the four sets of guide grooves, and four sets of arc-shaped extension channels running through the supporting plate.

The milk collecting device of the milking cup group can be placed on the lifting mechanism, while the milking cup is placed on the supporting positioning component. The supporting positioning component serves to guide and constrain the hose that connects to the top of the milking cup. When the lifting mechanism ascends, it secures the hose at the top of the milking cup, effectively clamping the milking cup in place. Subsequently, the cleaning mechanism is employed to clean both the inner and outer parts of the milking cup, thereby facilitating the cleaning process for the milking cup. This system ensures the thorough cleaning of milking cups and mitigates the risk of cross-infection between different batches of milking cows through the milking cup.

To enhance the above-described system, the clamping and fixing mechanism comprises a casing with a sliding sleeve attached to the outer ring of the supporting pipe, at a bottom of the casing, a ring gear ring is affixed, and a gear meshing on one side of the ring-shaped gear ring, a rotating shaft fixed with a gear fixed at a bottom of a movable sleeve at a bottom of a tray, and a rack slidingly connected with the supporting pipe, and the gear and rack meshing, an end of the rack extending into the supporting pipe is fixedly connected with a slider slidingly connected with the lifting mechanism, an outer ring at a top of a hood is fixedly connected with four groups of extension rods, wherein the four groups of extension rods collide with a bottom of a bracket, a second end of the extension rod is fixedly connected with a bottom splint with an arc structure, a top of a first end of the extension rod near a cover is fixedly connected with a connecting rod, wherein the connecting rod slides into the channel, fixedly connecting a top of one end of the connecting rod extending into the channel with a first extension rod in parallel with a second extension rod, the first and second extension rods are fixedly connected with a top splint of the circular arc structure.

It can complete the clamping and fixing operation of the milking cup, and realize the placement operation of the milking cup group. In the process of clamping, it does not contact with an outer ring of the milking cup, reducing the probability of bacteria present in milking cups.

To further enhance the system, the lifting mechanism comprises a screw which is sleeved with the bearing seat and the supporting pipe. At a top of the screw, wherein the screw is movablely sleeved with the supporting pipe through a bearing seat; a lifting rod, wherein the lifting rod is threaded sleeved at a top of the screw and slide-connected with the supporting plate; and a trapezoidal structure extrusion block fixed at a bottom of the lifting rod, the lifting rod extends out of a top of the supporting plate and is fixed with a placement plate, a side of the extrusion block away from the lifting rod is provided with a first chute, and an outside of the lifting rod is provided with a second chute connected with the first chute, and both the first chute and the second chute are slide-connected with the clamping and fixing mechanism.

To further enhance the cleaning mechanism, it comprises a push plate slidingly sleeved with the outer ring of the supporting pipe and four sets of cleaning pipes fixed on the top of the push plate, the top inner ring of the four sets of cleaning pipes is fixed with a sealed airbag with an annular structure, a bottom of the sealed airbag is reserved with an annular structure holding cavity located on a cleaning pipe body, a bottom inner ring of the cleaning pipe is provided with a receiving water tank at the top of the push plate, a discharge plate is fixedly connected with an annular structure at an opening of the receiving water tank, the discharge plate is penetrated with a discharge hole, and an inner ring of the discharge hole is fixed with a plugging plate, a top of a sealing plate is fixed with an intermediate nozzle with a conical structure at the top, an outer side of the intermediate nozzle is installed with a bulge fixed to a top of the discharge plate.

Realizing the cleaning operation of the inner and outer rings of the milking cup, and seal from the top during the cleaning process to avoid the escape of the cleaning liquid.

To optimize the above scheme, an inlet pipe is firmly attached to a bottom of an middle nozzle is installed with an inlet pipe fixed to the sealing plate, the middle nozzle runs through a nozzle hole, an inner wall of the cleaning pipe is provided with a nozzle connected to the holding cavity, fixedly connecting the cleaning pipe with the liquid inlet pipe connected with the holding cavity, fixedly connecting the bottom of the water tank with a drainage pipe connected with it, fixing the bottom of the push plate with a push unit fixed to the bottom plate, and the fixing cleaning pipe with a trachea connected to the sealed airbag.

For further enhancement of the above scheme, the supporting plate runs through a through hole which is slidingly connected with the lifting mechanism, and fixing the inner side wall of the through hole with a slider two which is slidingly connected with the lifting mechanism, the width of the storage groove gradually decreases along the direction from the storage groove to the guide groove.

As a further improvement of the above scheme, the cleaning pipe is located below the end of a guide groove away from a storage groove, the top and bottom sections of the guide groove away from the storage groove are fixed with an arc-shaped baffle fixed to the supporting plate, the guide groove is far away from the storage groove, the end is a semi-circular structure, and the arc of the guide groove is coaxial with the baffle.

As a further improvement of the above scheme, the bottom splint is far away from one end of the first extension rod and the top splint is far away from one end of the second extension rod, both of them have slope surfaces with inclined setting, and the slope surfaces are located on the concave side of the bottom splint or the top splint.

As a further improvement of the above scheme, the top of the bottom plate is equipped with a control box, a storage tank, a recovery box and an air pump, the air pump is connected with the trachea, the storage tank is connected with the inlet pipe one and inlet pipe two through the hose, and the recovery box is connected with the drainage pipe, the trachea, hose, inlet pipe one and inlet pipe two are equipped with solenoid valves.

Compared with the existing technology, the beneficial effect of the present invention lies in:

1. This system is achieved by incorporating a comprehensive set of components, including a bottom plate, a supporting pipe, supporting positioning components, a lifting mechanism, a clamping and fixing mechanism, a cleaning mechanism, a tray, storage groove, guide groove, penetration channel, screw, lifting rod, extrusion blocks, chute two, placed plate, enclosure, gear ring, gear, rack, extension rod one, bottom plate, connecting rod, extension rod two, and top splint. Collectively, these components establish a platform for the milking cup group, allowing for the organized placement of four milking cups while preventing contact between them. Furthermore, during the disinfection process, it securely clamps and fixes the hose at the milking cup's top, minimizing contact with the milking cup and thus lowering the risk of bacterial contamination through contact.

2. The cleaning and disinfection of the milking cup group are achieved through the integration of components including the push plate, cleaning pipe, sealing airbag, holding cavity, water tank, discharge hole, sealing plate, intermediate nozzle, and convex structure. This innovative design effectively addresses the cleaning of milking cups, mitigates the risk of cross-contamination between milking cups used for different batches of milking cows, and reduces the potential for cow infections during the milking process.

MAIN SYMBOL DESCRIPTION 1 bottom plate, 2 supporting pipe, 3 supporting positioning components, 4 lifting mechanism, 6 clamping and fixing mechanism, 7 cleaning mechanism, 11 reclamation container, 12 control box, 13 reservoir unit for liquids, 14 air pump, 16 drainage pipe, 17 inlet pipe 1, 15 18 22 24 26 solenoid valves, 21 inlet pipe 2, 23 hose connected to the air pump, 25 trachea, 27 milking cup, 28 hose connected to the milking cup, 31 supporting plate, 32 storage groove, 33 guide groove, 34 extension channel, 35 arc-shaped baffle, 41 screw, 42 lifting rod, 43 extrusion block, 44 chute 2, 45 placement plate, 46 slider, 61 cover shell, 62 gear ring, 63 gear, 64 rack, 65 extension rod one, 66 bottom splint, 67 connecting rod, 68 extension rod 2, 69 top splint, 71 push plate, 72 cleaning pipe, 73 sealed airbag, 74 holding cavity, 75 receiving water tank, 76 discharge hole, 77 sealing plate, 78 intermediate nozzle, 79 bulge.

DETAILED DESCRIPTION OF THE EMBODIMENTS

Furthermore, in conjunction with the accompanying diagrams and the specific implementation approach, the invention will be further elucidated. It is important to note that, provided there is no contradiction, the subsequent implementation scenarios or technical attributes may be combined at will to create new implementation scenarios.

Example 1

Figure 1:
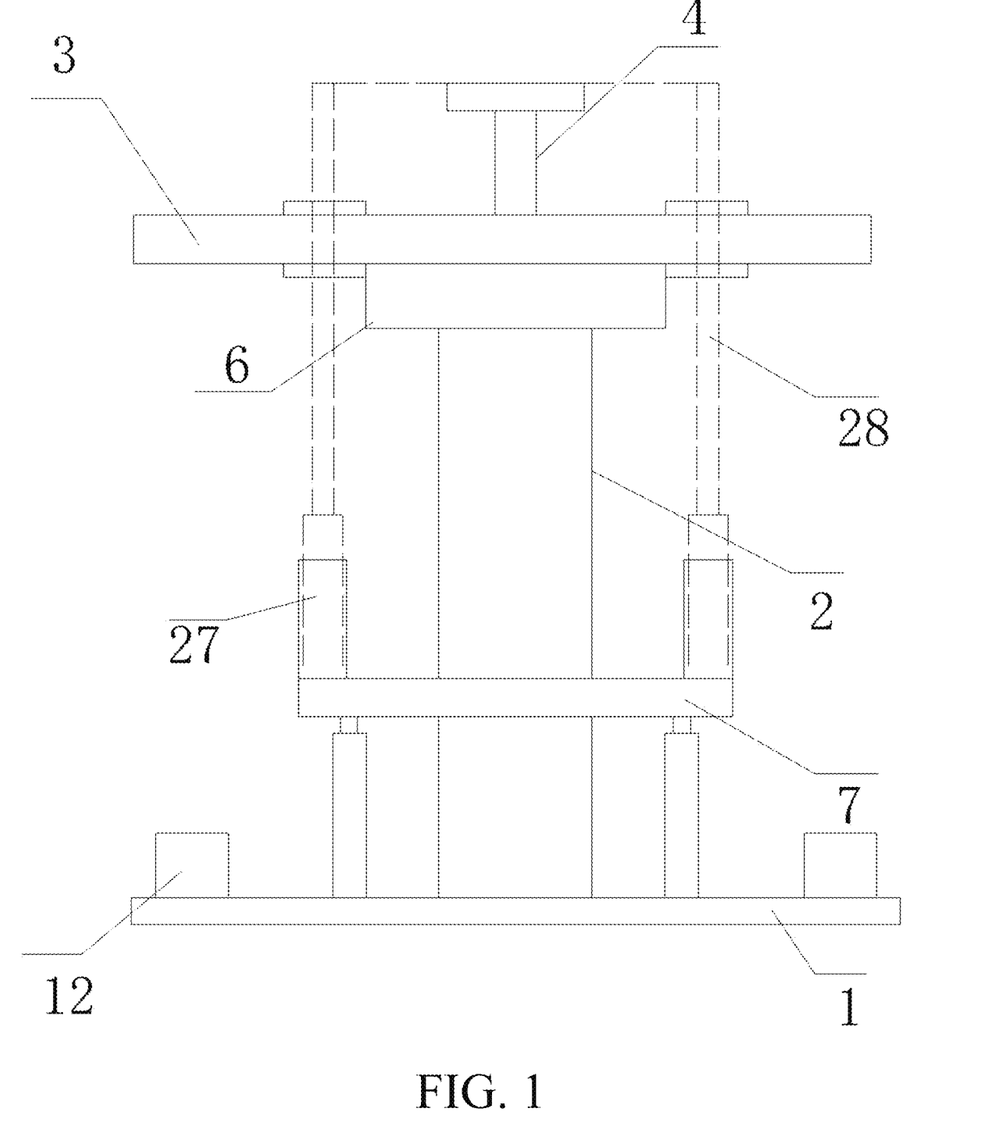
FIG. 1 is a schematic diagram of the overall structure of a rapid cleaning system of milking cups in milking hall provided by embodiment 1 of the present invention.

As depicted in FIG. 1, this implementation example of the rapid cleaning system for milking cups in the milking hall comprises a bottom plate 1, a supporting pipe 2 firmly affixed to the top of the bottom plate 1, a supporting positioning component 3 securely attached to the upper section of the supporting pipe 2, a lifting mechanism 4 slidingly encompassing the supporting pipe 2, a clamping and fixing mechanism 6 linking the outer circumference of the supporting pipe 2 to the supporting positioning component 3, and a cleaning mechanism 7 positioned at the lower extremity of the clamping and fixing mechanism 6 and slidingly connected to the supporting pipe 2;

The implementation principle of a rapid cleaning system of milking cups in milking hall is as follows:

The milk collector of the milking cup group is positioned on the lifting mechanism 4. When placing the milking cup 27 on the supporting positioning component 3, the hose 28 connected to the top of the milking cup 27 is guided by the supporting positioning component 3. As the lifting mechanism 4 ascends, it clamps and secures the hose 28 at the top of the milking cup 27, effectively performing the clamping action on the milking cup 27. Subsequently, the cleaning mechanism 7 is employed to cleanse both the inner and outer surfaces of the milking cup 27, thereby accomplishing the cleaning procedure of the milking cup 27. This innovative system effectively resolves the milking cup 27 cleaning process, mitigating the risk of cross-infection between different groups of milking cows.

Example 2

Figure 2:
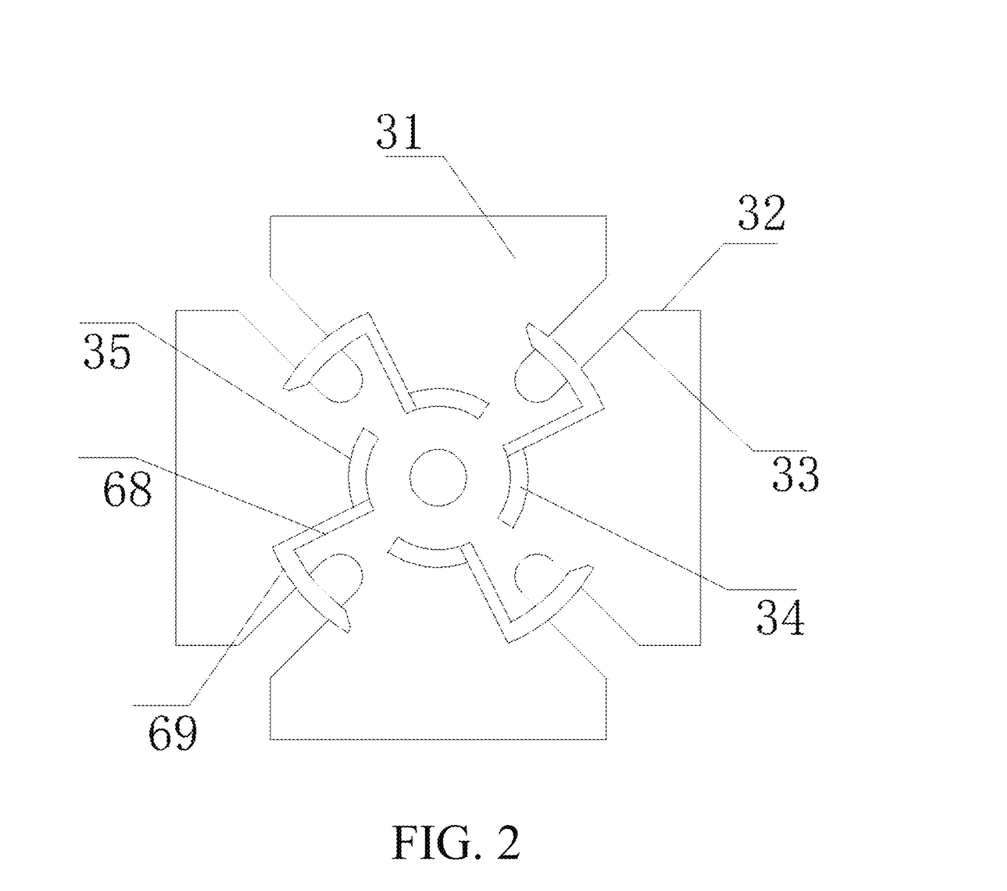
FIG. 2 is a structural schematic diagram of the open positioning component in embodiment 2 of the present invention.

According to FIG. 2, the further improvement of this example based on example 1 is:

The supporting positioning component 3 includes a long strip structure plate 31 fixed to the top of the supporting pipe 2. It also incorporates four sets of guide grooves 33, evenly distributed in an axial array along the outer side of the supporting plate 31. A storage groove 32 opens at the entrance of the four sets of guide grooves 33, and these are accompanied by four sets of arc-shaped structures 35 that pass through the supporting plate 31;

The supporting plate 31 extends through the through hole which is slidingly connected with the lifting mechanism 4. The inner wall of the through hole is securely fixed to the chute 2 44, which in turn is slidably connected to the lifting mechanism 4. The width of the storage groove 32 gradually narrows in the direction from the storage groove 32 to the guide groove 33. The chute 2 serves to restrict and guide the movement of a lifting rod 42;

While guiding and limiting the milking cup 27, the milk collector of the milking cup group for milking is placed on the lifting mechanism 4. When the milk collector is pushed upward, the connecting hose at the top of the milking cup 27 moves to the end of the guiding groove 33, which is situated away from the storage groove 32, due to the upward tension, thus achieving the guiding and limiting operation of the milking cup 27.

Example 3

Figure 3:
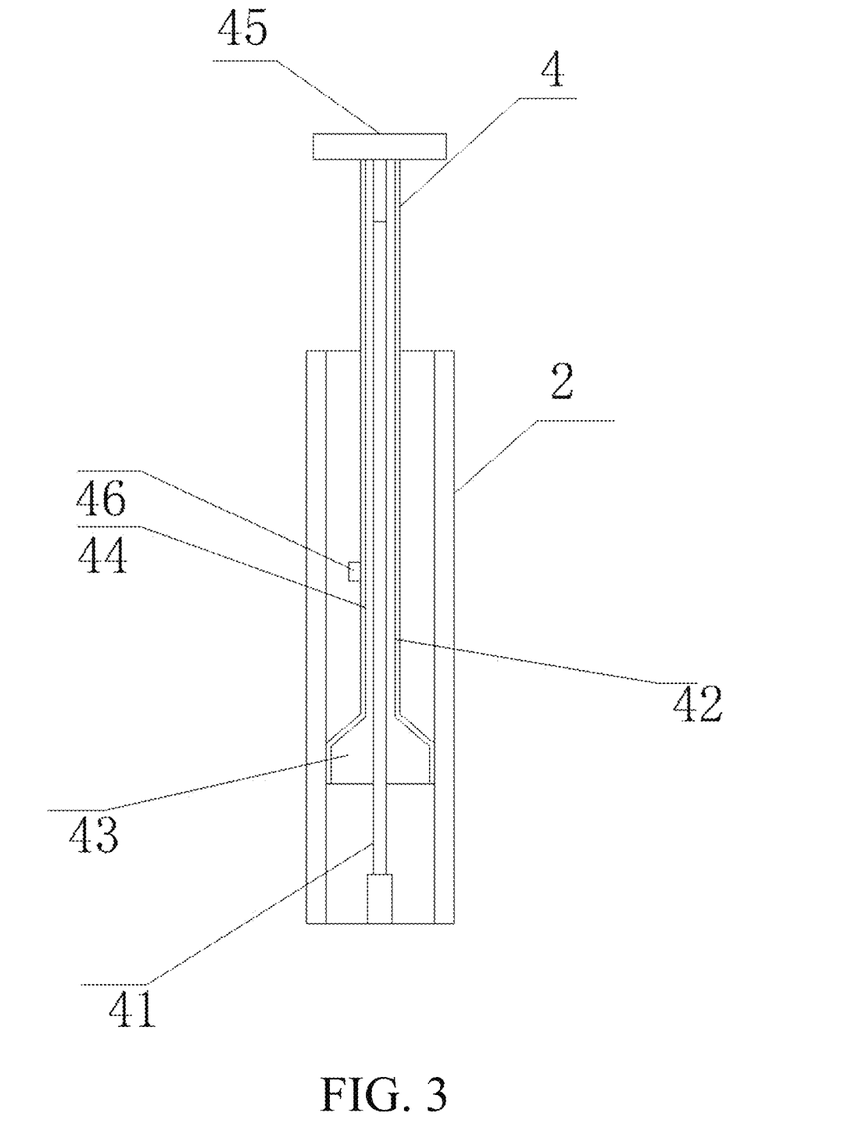
FIG. 3 is a structural schematic diagram of the lifting mechanism in the embodiment of the present invention.

According to FIG. 3, the further improvement of this example based on example 1 is:

The lifting mechanism 4 includes a screw 41 that is movably sleeved with the supporting pipe 2 through the bearing seat, a lifting rod 42 with a thread sleeve at the top of the screw 41, and it is slidingly connected to the supporting plate 31. There is a trapezoidal structure fixed at the bottom of the lifting rod 42. The lifting rod 42 extends to one end at the top of the supporting plate 31 and is fixed with a placement plate 45. The side of the extrusion block 43, which is situated away from the lifting rod 42, is equipped with a chute 1, and on the outside of the lifting rod 42, there is a chute 2 44 that connects to the chute 1. Both the chute 1 and chute 2 44 are slidingly connected to the clamping and fixing mechanism 6. A motor is fixed to the bottom plate 1 at the bottom of the screw 41 to ensure the stability of the rack 64's position during the lifting process with the lifting rod 42. The cross sections of chute 2 44, chute 1, and the slider 46 are all of T-shaped structures;

Upon starting the motor, the screw 41 rotates, thereby driving the lifting rod 42 to move upward. This upward movement pushes the milk collector positioned on top of the placement plate 45 in an upward direction. Simultaneously, the extrusion block 43 drives the clamping and fixing mechanism 6, causing it to clamp and fix in place.

Example 4

Figure 4:
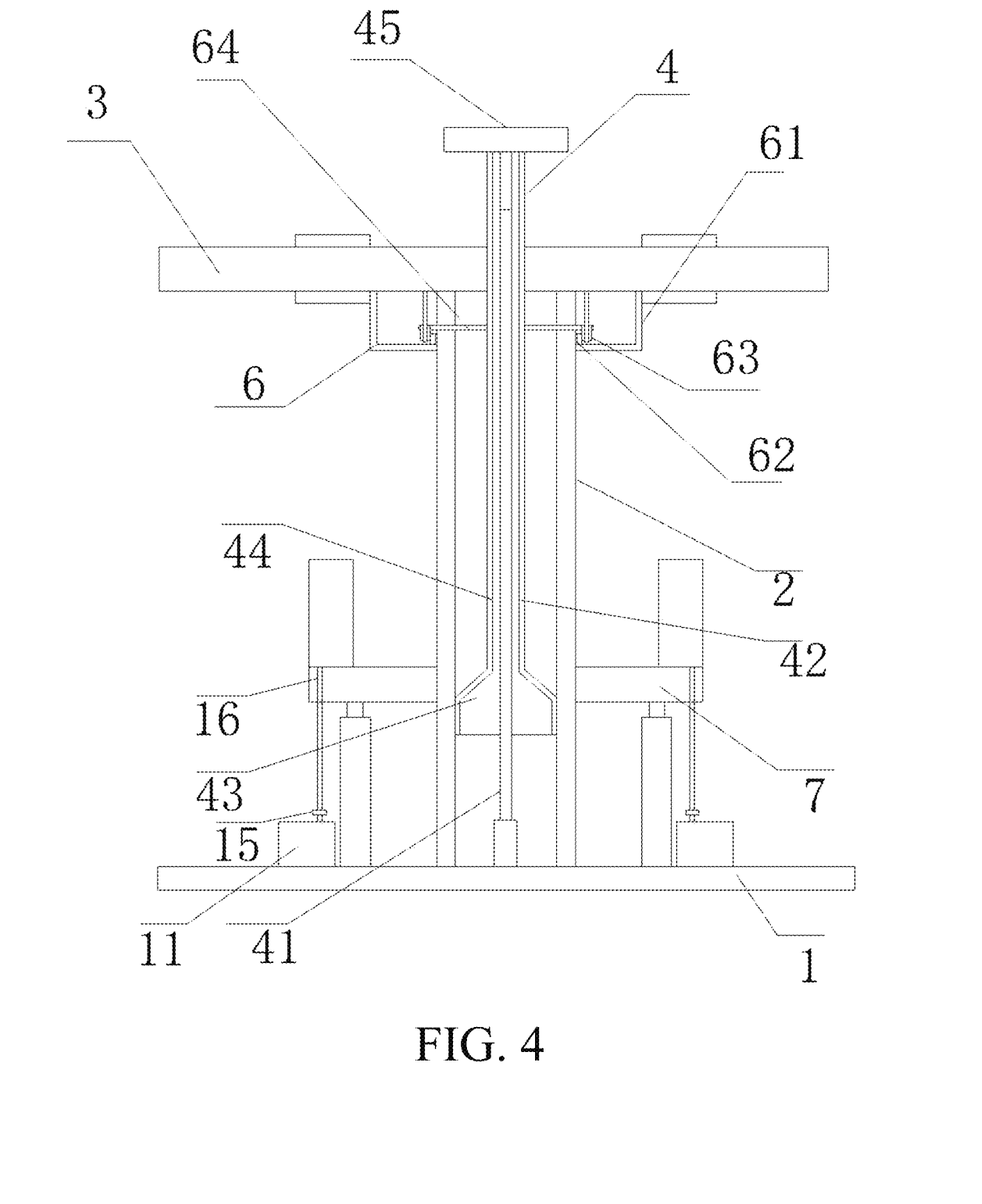
FIG. 4 is a structural schematic diagram of the clamping and fixing mechanism in the embodiment of the present invention.
Figure 5:
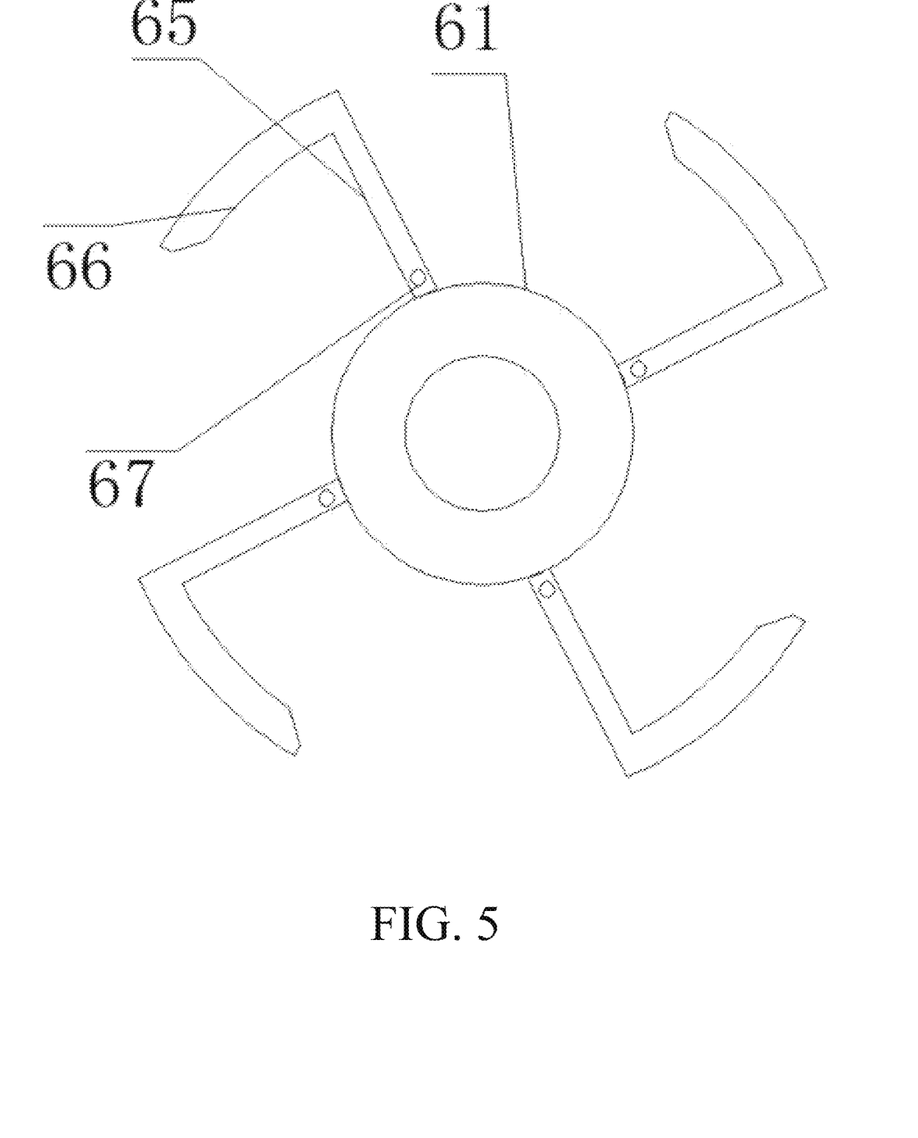
FIG. 5 is a bottom view of the clamping and fixing mechanism in the embodiment 4 of the present invention.

According to FIGS. 4-5, the further improvement of the example based on the example 1 is:

The clamping and fixing mechanism 6 includes a cover 61 which is connected with the sliding sleeve at the outer ring of the supporting pipe 2, the gear ring 62 which is fixed at the bottom of the cover 61, a gear 63 which is meshed on the side of the gear ring 62, the rotating shaft which is fixed to the gear 63 at the bottom of the supporting plate 31 and a rack 64 which is slidingly connected with the supporting pipe 2, and the gear 63 is meshed with the rack 64, the rack 64 extends to one end of the supporting pipe 2 and is fixed with the chute 2 44 slidingly connected with the lifting mechanism 4, the top outer ring of the cover 61 is fixed with four sets of extension rods 65 which are in conflict with the bottom of the supporting plate 31, the other end of the extension rod 65 is fixed with the bottom splint 66 of the arc structure 35, fixing the top of the extension rod 65 near the cover shell 61 with the connecting rod 67 which slides into the channel 34, fixing the top of the connecting rod 67 extending into the extension channel 34 with the extension rod 2 68 which is set in parallel with the extension rod 65, fixing the extension rod 2 68 is fixed with the top splint 69 of the arc structure 35;

The bottom splint 66 is far away from the end of the extension rod 65 and the top splint 69 is far away from the end of the extension rod 2 68, and the slope is tilted, and the slope is located on the concave side of the bottom splint 66 or the top splint 69;

In the process of clamping and fixing the milking cup 27, placing the milk collector of the milking cup group for milking on the placement plate 45 of the lifting mechanism 4 to move upward with the placement plate 45, and pushing the milk collector upward. meanwhile, the hose connecting the top of the milk collector moves to the end of the guide groove 33 away from the storage groove 32 under the action of upward tension, when the top of the milking cup 27 is close to the supporting plate 31, the extrusion block 43 on the lifting mechanism 4 moves to the position of the rack 64, and then under the extrusion of the extrusion block 43, the rack 64 drives the gear 63 to rotate, and then drives the gear ring 62 to rotate, so that the cover shell 61 rotates, when the cover shell 61 rotates, the extension rod on it rotates 65, and the top splint 66 moves in the direction of the guide groove 33, and cooperates with the baffle 35 on the supporting plate 31 to clamp the hose 28 from the bottom of the supporting plate 31, according to the same way as above, the hose 28 is clamped at the top of the supporting plate 31, when the clamping is completed, the rack 64 moves from the inclined surface of the extrusion block 43 to the vertical surface, meanwhile, the lifting mechanism 4 pushes the milk collector upward at one end, and pulls the hose upward, so that the top of the milking cup 27 contacts with the bottom of the bottom splint 66 and the stopper, and is clamped from the top of the milking cup 27, completing the clamping and fixing operation of the milking cup 27, and realizing the placement operation of the milking cup group, in the process of clamping, it does not contact with the outer ring of the milking cup 27, reducing the probability of bacterial contact infection.

Example 5

Figure 6:
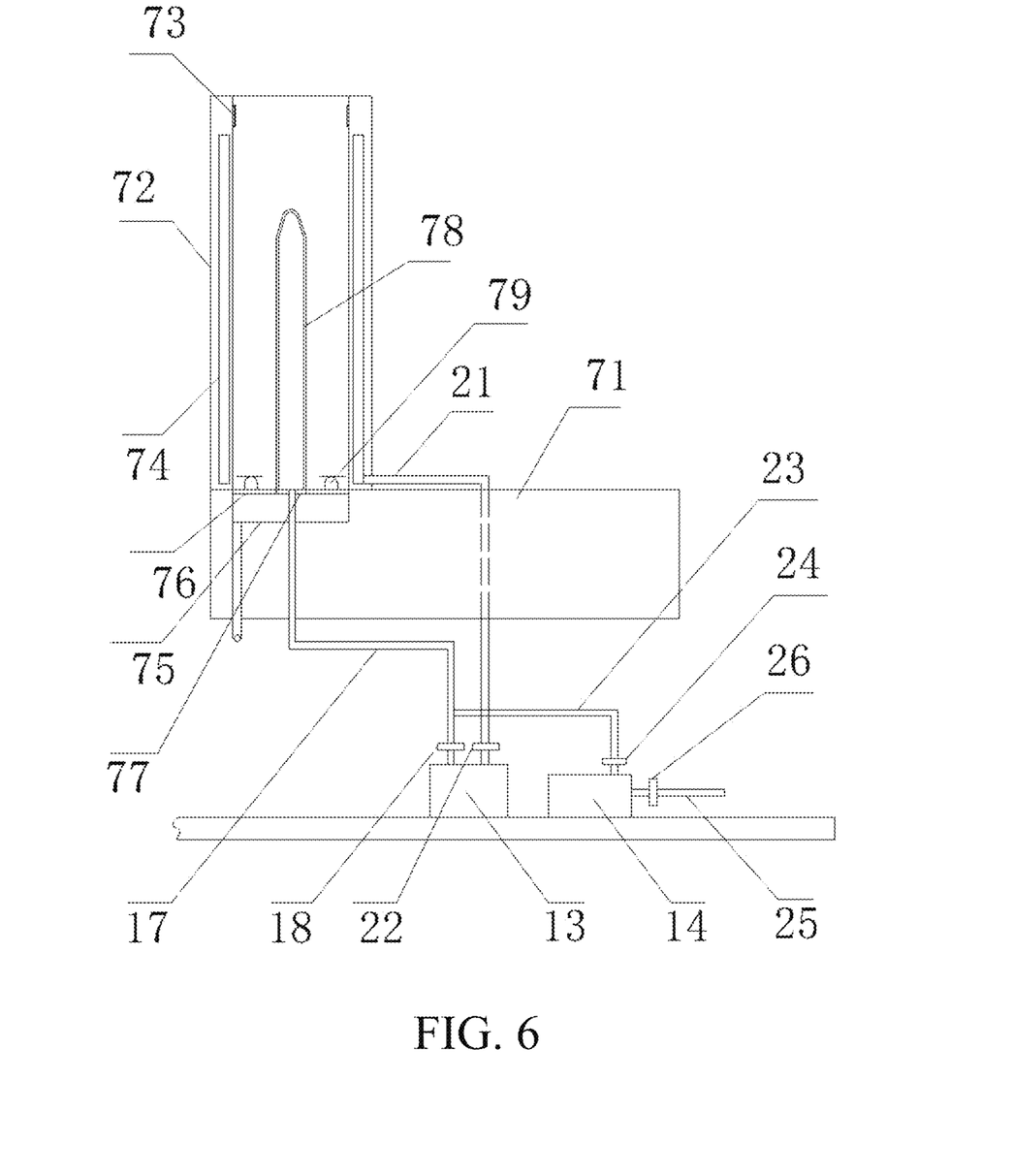
FIG. 6 is a structure diagram of the cleaning mechanism in the embodiment 5 of the present invention.

According to FIG. 6, the further improvement of this example based on example 1 is as follows:

The cleaning mechanism 7 includes a push plate 71 that is slid over the outer ring of the supporting pipe 2. It also includes four sets of cleaning pipes 72 that are affixed to the top of the push plate 71. The top inner ring of these four groups of cleaning pipes 72 is equipped with a ring-like structure. A sealed airbag 73 is incorporated, with its lower part forming an accommodating cavity 74, featuring a ring-like structure, situated on the body of the cleaning pipe 72. Additionally, at the bottom inner ring of the cleaning pipe 72, there is a water receiving tank 75 mounted at the top of the push plate 71. The opening of this water receiving tank 75 is secured by a ring-like structure. A discharge plate 76 has a discharge hole that passes through it, with the inner ring of the discharge hole 76 firmly attached to a sealing plate 77. The top of the sealing plate 77 is secured to the upper part of the intermediate nozzle 78, which has a conical structure at its top. The outer side of the intermediate nozzle 78 features a protrusion 79, which is attached to the top of the discharge hole 76;

The lower section of the intermediate nozzle 78 is affixed to an inlet pipe, which is securely connected to the sealing plate 77. The intermediate nozzle 78 extends through a nozzle hole, and the inner wall of the cleaning pipe 72 is equipped with a nozzle hole that connects to the holding cavity 74. The cleaning pipe 72 is firmly attached to an inlet pipe 2, which is connected to the holding cavity 74. The bottom of the water-receiving tank 75 is fixedly connected to a drainage pipe 16 linked to it. The lower part of the push plate 71 is securely fastened to the bottom plate 1. The push rod motor is employed to actuate unit one, and the cleaning pipe 72 is firmly connected to a gas pipe that links to the sealed airbag 73;

The cleaning pipe 72 is located beneath the termination of the guide groove 33, distanced from the storage groove 32, Both the upper and lower portions of the guide groove 33, situated opposite the storage groove 32, are equipped with arc-shaped baffles 35 affixed to the supporting plate 31. The end of the guide groove 33, situated away from the storage groove 32, exhibits a semi-circular structure, and the curvature of the guide groove 33 aligns with that of the baffles;

Throughout the cleansing procedure, the initial actuation by push unit 1 propels the entire assembly of push plate 7 in an upward direction. During this phase, cleaning pipe 72 traverses from beneath the outer circumference of the milking cup 27, and subsequently, intermediate nozzle 78 advances from the underside of the milking cup's inner rim, contacting the upper surface of raised section 79. Following this, the pneumatic system is engaged, causing the inflation of sealed airbag 73, which creates a hermetic seal at the upper portion of the milking cup 27. Subsequently, cleansing fluid is introduced via the first and second inlet pipes, entering the milking cup 27. The cleaning process ensues, with intermediate nozzle 78 directing the flow from the inner circumference of the milking cup 27, while cleaning pipe 72 attends to the outer rim of the milking cup 27. Consequently, the milking cup 27 undergoes thorough cleaning of both its inner and outer rims. Importantly, the hermetic seal established during this process prevents any leakage of the cleaning solution.

Example 6

The upper section of the bottom plate 1 is configured with a control unit encompassing a control box 12, a reservoir unit for liquids 13, a reclamation container 11, and an air pump 14. The air pump 14 is interconnected to the pneumatic system through tubing. Additionally, the liquid reservoir unit 13 establishes connections with both inlet pipe 1 17 and inlet pipe 2 21. Moreover, the air pump 14 is linked to both inlet pipe 1 17 and inlet pipe 2 21 through flexible hoses 23. An array of solenoid valves 26, 24, 18, 22 is installed within the pneumatic circuitry, encompassing the tracheal conduit 25, hoses 23, inlet pipe 1 17, and inlet pipe 2 21. Housed within the control enclosure is an electronic controller, which is interfaced with the solenoid valves, electric motor, air pump 14, and actuating motor for push rod displacement.

During the drying phase following the cleaning process, the solenoid valves on both the first and second inlet pipes are shut, while the solenoid valve on the hose is opened. This configuration allows the drying airflow to enter the first and second inlet pipes via the hose. The same principle used for cleaning is employed to dry both the inner and outer surfaces of the milking cup 27 effectively.

This design offers a dedicated platform for the milking cup group, allowing for the orderly placement of four distinct sets of milking cups. This segregation minimizes the potential for contact and cross-contamination between milking cups during placement, significantly reducing the risk of bacterial infections. Moreover, the system includes provisions for cleaning and disinfecting the milking cup group during placement. This comprehensive approach effectively addresses milking cup cleaning challenges, mitigates the risk of cross-infection between different groups of milking cows, and lowers the probability of cow infections during the milking process. Furthermore, during the disinfection phase, the hose at the top of the milking cup is securely clamped and immobilized to minimize contact with the milking cup, further decreasing the risk of bacterial transmission.

The previously described implementation method represents the preferred embodiment of the invention and should not be construed as limiting the scope of the invention's protection. Any modifications or substitutions made by skilled individuals in this field, which do not substantially deviate from the principles of the invention, fall within the scope of protection defined by the present invention.

What is claimed is:

1. A rapid cleaning system of milking cups in a milking hall, comprising a bottom plate, a supporting pipe fixed on a top of the bottom plate, a supporting positioning component fixed on a top of the supporting pipe, a lifting mechanism connected with a sliding sleeve of the supporting pipe, a clamping and fixing mechanism set up on an outer ring of the supporting pipe connected with the supporting positioning component, and a cleaning mechanism set at a bottom of the clamping and fixing mechanism and connected with the sliding sleeve of the supporting pipe;

the supporting positioning component comprises a long strip-shaped supporting plate fixed to the top of the supporting pipe, four sets of guide grooves distributed along an axis array of the supporting pipe on an outside of the supporting plate, a storage groove opened at an opening of the four sets of guide grooves, and four sets of arc-shaped extension channels running through the supporting plate.

2. The rapid cleaning system of the milking cups in the milking hall according to claim 1, wherein the clamping and fixing mechanism comprises a casing with a sliding sleeve attached to the outer ring of the supporting pipe, a ring-shaped gear ring fixed at a bottom of the casing, a gear meshing on one side of the ring-shaped gear ring, a rotating shaft fixed with a gear fixed at a bottom of a movable sleeve at a bottom of a tray, and a rack slidingly connected with the supporting pipe, and the gear meshing, an end of the rack extending into the supporting pipe is fixedly connected with a slider, wherein the slider is slidingly connected with the lifting mechanism, an outer ring at a top of a hood is fixedly connected with four groups of extension rods, wherein the four groups of extension rods collide with a bottom of a bracket, a second end of the extension rod is fixedly connected with a bottom splint with an arc structure, a top of a first end of the extension rod adjacent to a cover is fixedly connected with a connecting rod, wherein the connecting rod slides into the arc-shaped extension channel, a top of one end of the connecting rod extending into the arc-shaped extension channel is fixedly connected with a first extension rod in parallel with a second extension rod, the first and second extension rods are fixedly connected with a top splint of the arc structure.

3. The rapid cleaning system of the milking cups in the milking hall according to claim 2, wherein one end of the bottom splint away from the first extension rod and one end of the top splint away from the second extension rod both have slope surfaces with inclined setting, and the slope surfaces are located on a concave side of the bottom splint or the top splint.

4. The rapid cleaning system of the milking cups in the milking hall according to claim 1, wherein the lifting mechanism comprises a screw, wherein the screw is movablely sleeved with the supporting pipe through a bearing seat; a lifting rod, wherein the lifting rod is threaded sleeved at a top of the screw and slide-connected with the supporting plate; and a trapezoidal structure extrusion block fixed at a bottom of the lifting rod, the lifting rod extends out of a top of the supporting plate and is fixed with a placement plate, a side of the trapezoidal structure extrusion block away from the lifting rod is provided with a first chute, and an outside of the lifting rod is provided with a second chute connected with the first chute, and both the first chute and the second chute are slide-connected with the clamping and fixing mechanism.

5. The rapid cleaning system of the milking cups in the milking hall according to claim 1, wherein the supporting plate runs through a through hole, wherein the through hole is slidingly connected with the lifting mechanism, and an inner side wall of the through hole is fixed with a slider, wherein the slider is slidingly connected with the lifting mechanism, a width of the storage groove gradually decreases along a direction from the storage groove to the guide groove.

* * * * *